April 9, 1968
L. J. THRON
3,377,054
WIRE SECURING DEVICE
Filed Jan. 20, 1966
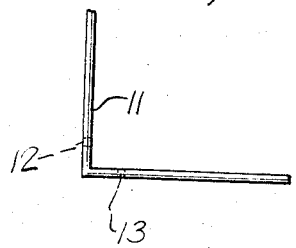
Fig. 1
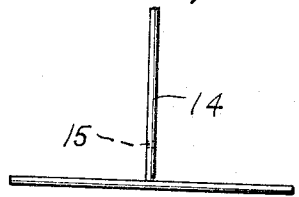
Fig. 2
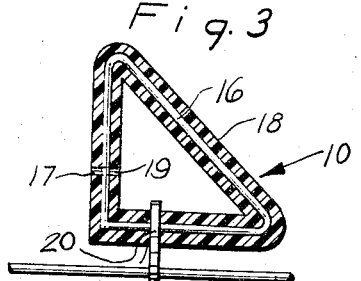
Fig. 3
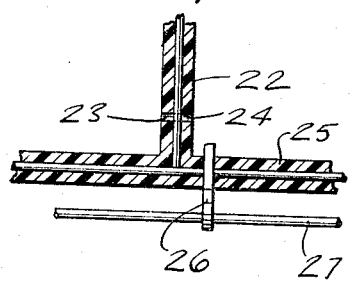
Fig. 4
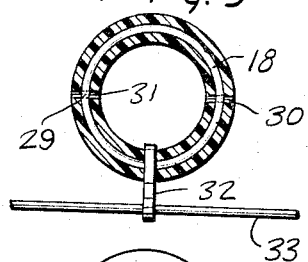
Fig. 5
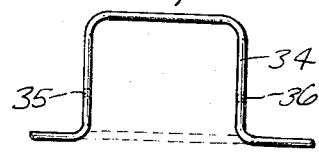
Fig. 6
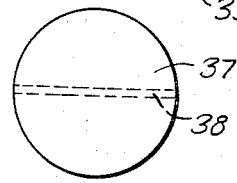
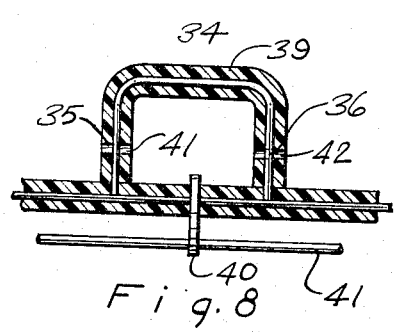
Fig. 8
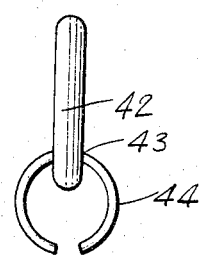
Fig. 7
Fig. 9
INVENTOR.
Louis James Thron

United States Patent Office 3,377,054
Patented Apr. 9, 1968

3,377,054
WIRE SECURING DEVICE
Louis J. Thron, 2306 S. Garden,
Visalia, Calif. 93277
Filed Jan. 20, 1966, Ser. No. 521,858
1 Claim. (Cl. 256—47)

ABSTRACT OF THE DISCLOSURE

A device for supporting wire from a fence post or the like, the device comprising a wire covered by a weather resistant plastic sleeve, the device being adaptable to be made in several various modified designs for specific applications.

---

This invention relates to securing devices, and more particularly a wire securing device.

It is therefore the main purpose of this invention to provide a wire securing device which can be firmly attached to poles, fences and other objects for securing and supporting wire.

Another object of this invention is to provide a wire securing device which is adapted to be firmly attached to surfaces having varying configurations and shapes.

Another object of this invention is to provide a wire securing device having plastic or rubber sleeve thereon for protecting said device from adverse weather conditions.

Still another object of this invention is to provide a wire securing device which is of a rigid construction, is inexpensive to manufacture and provides maximum utility to its user.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

In the drawing;

FIGURES 1, 2, 3, 4, 5, 6, and 8 are side elevational views of this invention.

FIGURE 7 is a plan view of a post.

FIGURE 9 is an end view of the hook shown removed from the invention.

According to this invention, a wire securing device 10 may be described in various forms and configurations. For example, device 10 may be depicted as an L-shaped rod 11 having holes 12 and 13 therein interchangeably serving to secure rod 11 to a post by means of a nail (not shown) and to secure a portion of the wire therein and inverted T-shaped rod 14 is also adapted to be firmly inserted into a post or a portion of a fence and having the wire supported on rod 14 through its hole 15. FIGURE 3 shows metallic wire of substantially triangular configuration having plastic or rubber sleeve thereon and being secured to a fence by means of a nail protruding through holes 17 and 19 of said device 10. Hook 20 is used to support wire 21 on the sleeve portion 18. This type of arrangement is usually adapted to be used with the electrical equipment, such as, providing electric power to various farm implements from a generator or a conventional power source. Another version of this invention is shown in FIGURE 4 wherein an inverted T-shaped rod is provided with a plastic or rubber sleeve 25. Said rod is connected to a fence post by means of a nail or screw which is adapted to penetrate through holes 23 and 24. One side of said impregnated rod 22 is provided with a hook 26, which is adapted to secure and support wire 27. The above mentioned arrangement may be adapted to support a number of hooks thereby supporting a plurality of wires. In a different embodiment of this invention a circular wire 28 is provided with holes 29 and 30 positioned in parallel from each other and being adapted to support an auxiliary wire (not shown) which is suspended between the posts. A circular plastic or rubber sleeve is adapted to enclose said wire and is provided with a hole 31 which corresponds with the diameter of holes 29 and 30 and is positioned on the same plane. One end of said circular device 10 is provided with a securing member 32 which is capable of affixing wire 33 to said device 10 (see FIGURE 5) and is adapted to maintain a parallel relationship between the auxiliary wire and wire 33. This arrangement is very valuable where it is desired to prevent long stretches of wire 33 from sagging without having to maintain a great number of expensive posts. FIGURES 6 and 8 show an inverted U-shaped thick wire 34 having holes 35 and 36 provided therein for securing wire 34 to an auxiliary outlet (not shown). An impregnated sleeve 39 encloses wire 34, said sleeve is provided with holes 41 and 42 which are of same diameter as holes 35 and 36 of inverted wire 34. The bottom portion of this arrangement is provided with a supporting member 40 which is adapted to secure and support electric wire 41. FIGURE 7 shows the top view of a post having hole 38 protruding thereto and adapted to admit a conventional wire. FIGURE 9 is an end view of a hook 42 having a hole 43 adapted to admit wire 44 which is shown in a substantially cylindrical form for the purposes of illustion only.

The device works in the following manner: The holder slides downward over the top of the post to whatever height that the wire is desired to be. The person then places a cotter pin in the opening of the holder and post so as to hold the device in place. The person then places the wire in the hook, the hook holding the wire in place for stretching. It also holds the wire in place after stretching operation.

What I now claim is:

1. A wire securing device, comprising a substantially triangular metallic member having an opening therein, a sleeve member enclosing said metallic member, said sleeve member being provided with a pair of openings which correspond with said opening of said metallic member, and being adapted to admit a nail for securing said metallic member to a post, and a securing member adapted to firmly affix the wire to said securing device, said metallic member including a heavy gauge wire, said sleeve member including a sleeve made of plastic material adapted to enclose said metallic member and prevent it from rusting and corrosion, said securing device including a clamp member, one end of which is firmly secured to said securing device, the other end of said clamp being provided with an opening for admitting a wire therethrough and said opening through said triangular metallic member and sleeve member being positioned along a substantially central portion of one of the legs forming said triangular member, said opening extending along a plane which corresponds to the flat plane of said triangular member.

References Cited

UNITED STATES PATENTS

| | | |
|---|---|---|
| 542,370 | 7/1895 | Mount. |
| 587,614 | 8/1897 | Stram. |
| 2,247,251 | 8/1948 | Huette. |
| 2,502,882 | 4/1950 | Perkins _____ 256—10 |
| 2,865,609 | 12/1958 | Steiner _____ 256—10 |
| 3,080,149 | 3/1963 | Pilbove _____ 256—10 X |

FOREIGN PATENTS

| | | |
|---|---|---|
| 174,842 | 5/1953 | Austria. |
| 230,608 | 12/1963 | Austria. |
| 525,735 | 1/1954 | Belgium. |

DAVID J. WILLIAMOWSKY, *Primary Examiner.*

DENNIS L. TAYLOR, *Examiner.*